Sept. 21, 1965 J. NADO 3,207,893
FLUORESCENT PATIO LAMP AND THE LIKE
Filed Feb. 7, 1963 2 Sheets-Sheet 2
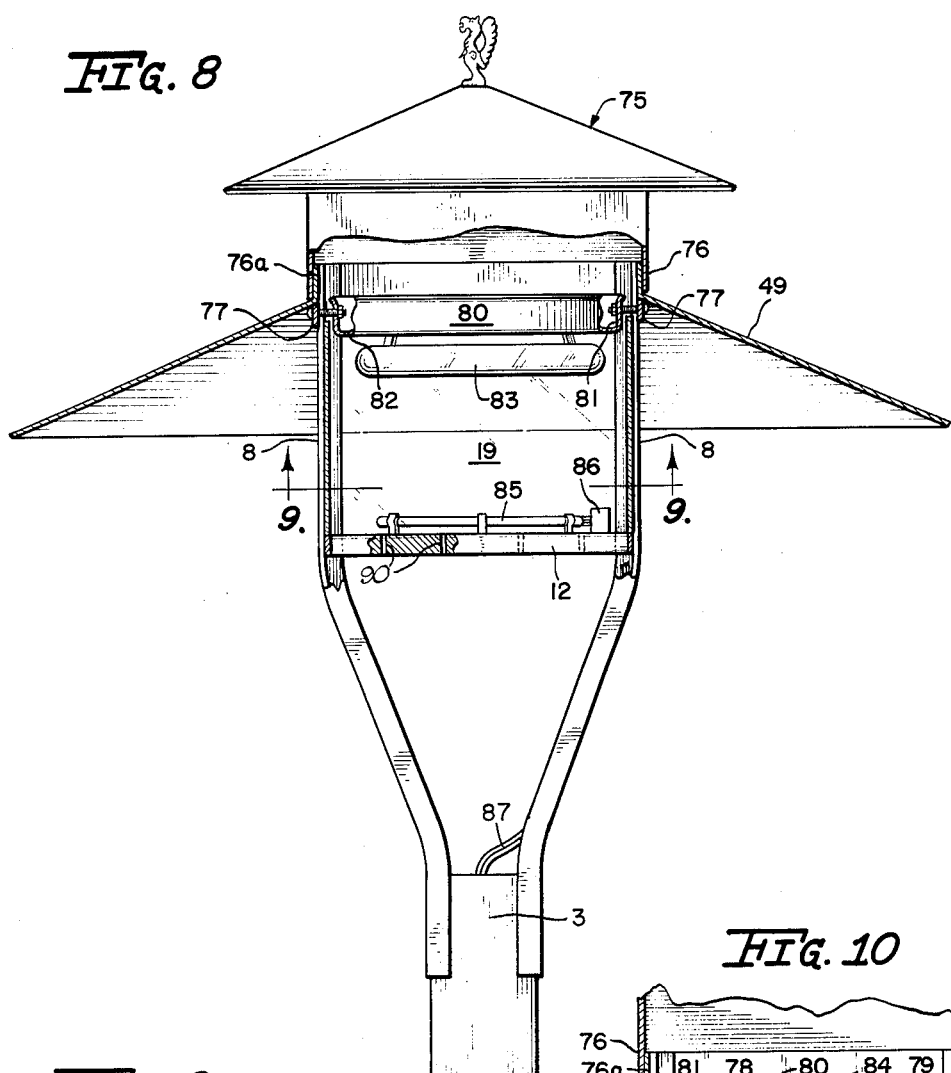
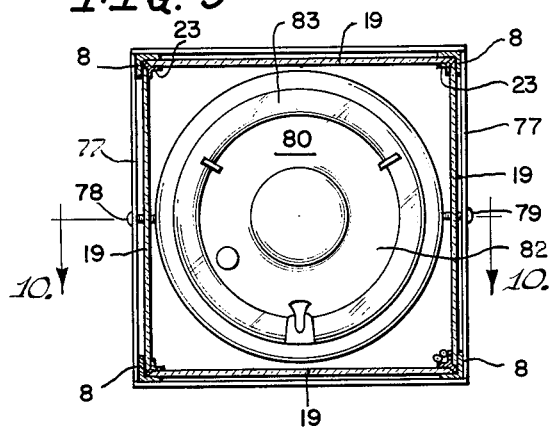
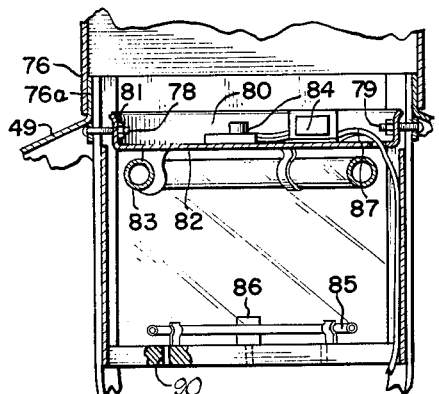
INVENTOR.
Joseph Nado
BY
John J. Kowalik
Atty.

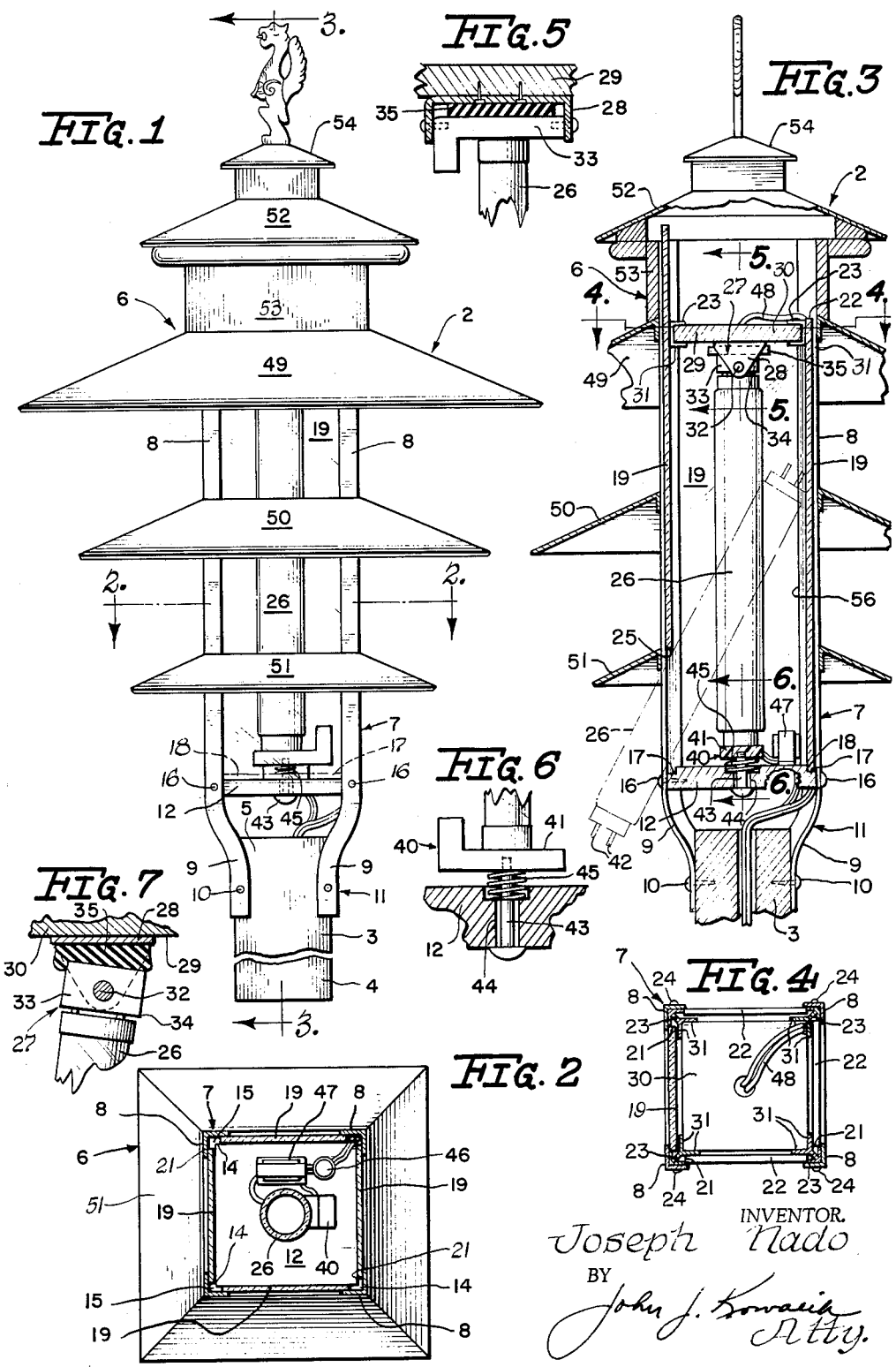

United States Patent Office 3,207,893
Patented Sept. 21, 1965

3,207,893
FLUORESCENT PATIO LAMP AND THE LIKE
Joseph Nado, 1830 W. Newport Ave., Chicago, Ill.
Filed Feb. 7, 1963, Ser. No. 256,861
4 Claims. (Cl. 240—25)

This invention relates to fluorescent light fixtures of the type particularly adapted for outdoor use.

In the art of providing a patio light consideration must be given not only to the mechanical aspects of the fixture but also the aesthetic effects thereof. Heretofore, as far as is known to me, no fluorescent light fixtures have been available as a pole light for outdoor use. I suspect that inasmuch as the fluorescent lamp is an elongated tube it has posed numerous design difficulties in providing a practical unit which may be readily assembled and dismantled.

Furthermore, fluorescent lights operate most efficiently between 60° and 90° F. and therefore, heretofore it was considered impractical to provide an outdoor fluorescent light for the temperate and northern zones.

It is a primary object of this invention to devise a novel outdoor fluorescent light which combines an aesthetic appearance with a good functional design capable of easy assembly and wherein the parts collectively support each other and rigidify the structure.

A further object of the invention is to devise a novel fluorescent fixture in which there is provided a novel heating means either in the form of a ballast transformer or a separate heating element for maintaining the light fixture at optimum operating temperature.

A further object of the invention is to provide a novel structure for heating the fluorescent tube comprising a vertically elongated translucent envelope telescoped over the tube which is centered therein, the envelope forming a chimney for drafting heated air along the tube so that it operates at optimum temperature and to keep the glass envelope clear, the heated air being supplied by heating means located on a tube-supporting base at the lower end of the envelope.

A further object of the invention is to provide a novel self-adjusting support for the elongated fluorescent tube which facilitates insertion and removal of the tube with respect to its sockets and which biases and holds the tube in operating position.

Another object of the invention is to provide a novel assembly of the shielding envelope with the structural parts of the lamp such that a panel of the envelope is movable vertically to provide an opening in a side of the envelope of sufficient dimension to permit insertion and removal of the tube without the necessity for extensively dismantling the unit.

More specifically the novel light mounting comprises upper and lower socket assemblies mounted on associated supports, the upper assembly comprising a hinging part and a hinged tube socket part pivotally interconnected on an axis transverse to the longitudinal axis of the tube, and there being interposed between the two parts resilient means in the form of a pad of elastomer material which is adapted to be compressed attendant to swinging or angling movement of the hinged part from a centered neutral position to either side of neutral whereby with the tube entered into the hinged socket part the tube is constantly biased into a centered position which is in alignment with the socket for the other end of the tube to thus urge their interlock. The invention comprehends the provision of a novel thermally balanced structure in a light fixture which comprises an elongated preferably metallic skeletal frame enclosing transparent glass panels which have relative sliding movement therewith, the panels forming an envelope enclosing the fluorescent tube and the tube being dispised coaxial with the frame and envelope and being mounted at opposite ends from the frame by yieldable means which not only adapt the mounting to accept tubes of slightly different dimensions but which also permit expansion and contraction of the frame while maintaining good electrical connections with the tube. These and other objects and advantages inherent in the invention will become more readily apparent from the specification and the drawings, wherein:

FIGURE 1 is a side elevational view of one form of my invention;

FIGURE 2 is a cross-sectional view taken substantially on line 2—2 of FIGURE 1;

FIGURE 3 is a longitudinal sectional view taken essentially on line 3—3 of FIGURE 1;

FIGURE 4 is a cross-sectional view taken substantially on line 4—4 of FIGURE 3;

FIGURE 5 is an enlarged fragmentary sectional view taken substantially on line 5—5 of FIGURE 3;

FIGURE 6 is an enlarged fragmentary sectional view taken substantially on line 6—6 of FIGURE 3;

FIGURE 7 is an enlarged fragmentary sectional view taken substantially on line 7—7 of FIGURE 5;

FIGURE 8 is a side elevational view partly in vertical section of another form of my invention;

FIGURE 9 is a cross-sectional view taken substantially on line 9—9 of FIGURE 8, and FIGURE 10 is a cross-sectional view taken substantially on line 10—10 of FIGURE 8.

Description of FIGURES 1–7

Describing the invention in detail and having particular reference to FIGURES 1–7 of the drawings there is shown a patio or pole light generally designated 2 which comprises a post 3 adapted to be anchored in the ground at its lower end 4 and at its upper end 5 supporting the novel lamp or light 6.

The light 6 in one embodiment thereof comprises a skeletal framework generally designated 7 which includes quadrilaterally arranged vertical corner angle beams 8, each of which has an inwardly offset lower end portion 9. The lower portions 9 embrace the upper end of the post 3 and are attached thereto as by screws 10.

The lamp or light 6 is provided above its mounting portion 11 formed by the portions 9, with a base 12 which comprises a preferably flat quadrilateral, or more specifically square plate which has its corners 14 nested within the corners 15 of the frame members 8 and secured thereto as by screws 16. The base 12 is preferably grooved as at 17, 17 in its upper side along its four edges and within each groove admits the lower edge 18 of the associated glass or plastic transparent or translucent panel 19 which spans the space between adjacent frame elements 8. Panels 19 form an envelope and are secured along their lateral edges 21 adjacent to their upper ends 22 (FIG. 3) by brackets 23 secured as by screws 24 to respective elements 8. The brackets 23 permit vertical sliding movement of the panels to provide an opening as at 25 (FIG. 3) at one side of the lamp to permit insertion and withdrawal of the fluorescent light bulb or tube 26.

The upper socket assembly 27 for the tube is preferably pivotally mounted on a substantially horizontal axis and comprises an upper mounting portion 28 by means of which the socket assembly 27 is secured to the underside 29 of the top support 30 which is secured to the corner brackets 23 by means of the embracing prongs 31 formed on the bracket 23. The mounting portion 28 has dependent ears which support a horizontal pintle 32 which passes through the body 33 of the socket portion 34.

Biasing means may be provided in the nature of a resilient pad of material 35 between the upper side of the body 33 and the underside 29 of the upper support whereby the tube 26 is urged pendulously to a substantially vertical position into the lower socket 40 which comprises a slotted body portion 41 for admitting the lower prongs 42 (FIG. 3) of the light tube.

The lower socket 40 is preferably universally mounted by means of a rivet or bolt assembly 43 (FIG. 6) threaded vertically into the body portion 41 and loosely anchored through opening 44 in the bottom base support 12. A resilient element or coil spring 45 is compressed between the top side of the base 12 and the underside of the body portion 41.

It will be observed that the lamp is so dimensioned that the light tube 26 can be canted as shown in FIGURE 3 and withdrawn or inserted through the opening 25. The tube is inserted and removed from the upper and lower sockets as is well known to those skilled in the art by a twisting action.

The lower socket is suitably wired through a starter 46 and ballast 47 carried on top of the lower support 12 and the lower socket is connected to wires 48.

The lamp is provided with a plurality of vertically spaced peripheral frusto-pyramidal shades 49, 50 and 51 which preferably graduate from a largest dimension to smallest size from top to bottom. The top of the lamp is provided with a suitable bonnet 52 having a peripheral depending skirt 53 sleeved over frame 7 and a suitable ornamented cover portion 54.

A feature of the present invention is the provision of novel heating apparatus or means for heating the envelope and thus the tube 26, it being understood that the fluorescent lamp operates best in temperatures between 60° and 90°. The present invention takes advantage of a ballast of the type which becomes heated to a temperature sufficient to give off considerable heat within the envelope 56. Since the ballast is located at the bottom of the vertically elongated envelope 56 a chimney effect is obtained since the heat rises. Thus the ballast in this embodiment serves as a heater.

It will be noted that since the glass panels are relatively slidable lengthwise of the frame members 8 which I prefer to form of metal such as aluminum, there is freedom for the frame to expand and contract between extremes of temperature and that the yieldable mountings of the tube accommodates such expansion and contraction while maintaining good electrical contact. Furthermore, by having a pad of rubber at one end, a damping effect is provided on the metal spring 45 so that if the ballast should hum, the tube will not vibrate excessively.

Referring now to the embodiment of FIGURES 8-10 wherein like parts are identified with corresponding reference numerals, it will be noted that in this embodiment the bonnet 75 is formed with a skirt 76 which encompasses the upper portion of the lamp and sleeves on a square frame 76a opposite members 77 of which mountings via a bolt and nut assemblies 78 and 79 for a dished annular reflector support 80. The assemblies 78 and 79 extend through the upwardly directed flange 81 which is integral with the annular dish 82 from which is supported the circular fluorescent lamp 83. The ballast and starter 84 are housed in the support 80. In this embodiment the reflector is adapted to be inverted to remove or replace the bulb. Furthermore the light is self-balancing and adjusting and if desired to light one area at one side more than the other the reflector may be tilted.

The upper shade 49 is secured to flange 76a which fits between the lamp frame and the skirt 76. The heating means in the present instance may be the ballast assembly. However, for purposes of disclosure I prefer to use a heating resistance rod 85 of any conventional construction coupled in series with a thermostat 86 which is wired to the power cord 87 which also is wired to the ballast assembly and lamp. The heating means 80 may be set to provide an optimum temperature of about 75° to 80° and then be cut off by the thermostat. A chimney effect is obtained by the vertically elongated envelope causing the air currents to rise through openings 90 in base 12 and bathe the tube in warm air. The novel assembly by heating the envelope melts snow and the like off the glass panels.

It will be seen that removal of the bonnet will expose the ballast etc. and inversion of the reflector will expose the lamp.

What is claimed is:

1. An outdoor fluorescent light for use in cold and warm weather comprising a support, a vertically elongated envelope carried thereon, a fluorescent light tube therein, and heating means within the envelope beneath the tube for updrafting warm air over the tube, said tube being annular in shape, and a support for said tube swingably mounting the same about a substantially horizontal axis for tilting the tube to one side or the other for illuminating one side more than the other and channeling the warm air along one side of the envelope, said support being smaller than said envelope transaxially of the longitudinal axis of the envelope and disposed within the envelope adjacent to its upper end.

2. In a fluorescent light, the combination of a support, a mounting structure pivotally carried from the support on a predetermined axis, a fluorescent tube having electrical and support connections at one end through said mounting structure, and extending longitudinally transversely of said axis, and a socket structure mounted on the support in the path of movement of the opposite end of the tube for engagement thereby for support and electrical connection, said mounting structure including a mounting portion with ear means, a socket portion between said ear means, pin means pivotally connecting the socket portion to the ear means, and a pad of elastomer material stressed between said portion for biasing the socket portion to a selected position.

3. The invention according to claim 2 and a pad reacting against said mounting portion urging the socket portion to a position engaging the other end of the tube with said socket structure.

4. The invention according to claim 3 and yieldable means between said support and said socket structure urging said socket structure against the tube axially thereof and urging said tube axially against said mounting structure and having a universal connection with the support whereby said socket structure and mounting structure are alignable with the tube.

References Cited by the Examiner

UNITED STATES PATENTS

| | | | |
|---|---|---|---|
| 1,421,058 | 6/22 | Barkschat | 240—25 |
| 2,103,047 | 12/37 | Uyterhoeven et al. | 240—11.4 |
| 2,500,007 | 3/50 | Polevitzky | 240—51.11 |
| 2,511,440 | 6/50 | Long | 240—25 |
| 2,563,635 | 8/51 | Askin | 240—51.11 |
| 2,597,060 | 5/52 | Boutelle et al. | 240—11.4 |
| 2,606,225 | 8/52 | Pistey | 240—51.11 |
| 2,610,289 | 9/52 | Brainerd | 240—51.11 |
| 2,710,910 | 6/55 | Grimes | 240—2.1 |
| 2,775,743 | 12/56 | Goddard | 339—56 |
| 2,849,598 | 8/58 | Lipscomb | 240—51.11 |
| 2,896,066 | 7/59 | Quetin | 240—51.12 |
| 3,141,620 | 7/64 | Guggemos | 240—51.11 |

NORTON ANSHER, *Primary Examiner.*